United States Patent
Lin

(10) Patent No.: US 11,419,121 B2
(45) Date of Patent: Aug. 16, 2022

(54) DATA TRANSMITTING METHOD, DATA RECEIVING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/925,823

(22) Filed: Jul. 10, 2020

(65) Prior Publication Data

US 2020/0351893 A1 Nov. 5, 2020

Related U.S. Application Data

(63) Continuation of application No. PCT/CN2018/074357, filed on Jan. 26, 2018.

(51) Int. Cl.
*H04W 56/00* (2009.01)
*H04W 72/04* (2009.01)
(Continued)

(52) U.S. Cl.
CPC ........ *H04W 72/0493* (2013.01); *H04B 1/713* (2013.01); *H04W 72/0446* (2013.01); *H04W 80/08* (2013.01)

(58) Field of Classification Search
CPC ......... H04W 72/0493; H04W 72/0446; H04W 80/08; H04B 1/713
(Continued)

(56) References Cited

U.S. PATENT DOCUMENTS

2012/0281679 A1* 11/2012 Fan ...................... H04W 74/008
                                                     370/336
2016/0353486 A1* 12/2016 Xia ...................... H04W 72/044
2018/0219576 A1*  8/2018 Bhattad ............. H04W 72/0446

FOREIGN PATENT DOCUMENTS

CN      106507497 A     3/2017
CN      107005998 A     8/2017
(Continued)

OTHER PUBLICATIONS

The EESR of corresponding European application No. 18900192.8, dated Feb. 4, 2021.
(Continued)

*Primary Examiner* — Sai Ming Chan
(74) *Attorney, Agent, or Firm* — Ladas & Parry LLP

(57) ABSTRACT

A data transmitting method, a data receiving method, a terminal device, and a network device are provided. The method includes: determining, by a terminal device, a target resource based on a time index and/or configuration information; and transmitting, by the terminal device, data to a network device on the target resource. The terminal device can control resource granularity of the target resource to meet transmission requirements of the terminal device, and can further avoid an actual data transmission process from occurring only on a same frequency domain resource and can further improve the frequency diversity gain in the non-slot transmission. In addition, randomness of interference can be enhanced as much as possible to avoid a same user from always or frequently being in conflict, so when a DMRS of the terminal device conflicts with that of other terminals, performance of user identification can be effectively improved.

12 Claims, 4 Drawing Sheets

(51) Int. Cl.
   *H04B 1/713* (2011.01)
   *H04W 80/08* (2009.01)
(58) Field of Classification Search
   USPC .......................................................... 370/329
   See application file for complete search history.

(56) References Cited

FOREIGN PATENT DOCUMENTS

| | | |
|---|---|---|
| CN | 107318086 A | 11/2017 |
| CN | 107484175 A | 12/2017 |
| EP | 2946624 A1 | 11/2015 |
| JP | 2020513177 A | 4/2020 |
| WO | 2016167828 A1 | 10/2016 |
| WO | 2018184440 A1 | 10/2018 |

OTHER PUBLICATIONS

3gpp 3gpp:"3rd Generation Partnersbip Project; Technical Specification Group Radio Access Network; NR; Physical layer procedures for data(Release 15)", Dec. 8, 2017 (Dec. 8, 2017), pp. 1-72, XP055767772.

International Search Report (ISR) dated Sep. 29, 2018 for Application No. PCT/CN2018/074357.

The first Office Action of corresponding European application No. 18900192.8, dated Oct. 26, 2021.

3rd Generation Partnership Project;Technical Specification Group Radio Access Network;NR;Physical layer procedures for data (Release 15),3GPP TS 38.214 V15.0.0(2017-12), Jan. 3, 2018, Section 6, Section 3, section 01.

Text proposal for UL transmission procedure[onliNe] and 3GPP TSG RAN WG1 adhoc_NR_AH_1801 R1-1800513, Internet<URL:http://www.3gpp.org/ftp/tsg_ran/WG1_RL1/TSGR1_AH/NR_AH_1801/Docs/R1-1800513.zip>, Jan. 12, 2018.

The first Office Action of corresponding Japanese application No. 2020-538538, dated Nov. 24, 2021.

The first Office Action of corresponding Canadian application No. 3088215, dated Aug. 3, 2021.

The first Office Action of corresponding Chinese application No. 202010736719.7, dated Aug. 5, 2021.

The first Office Action of corresponding Indian application No. 202017034251, dated Aug. 27, 2021.

The first Office Action of corresponding Korean application No. 10-2020-7022873, dated Feb. 8, 2022.

3GPP, TS38.214 v1.3.0, NR: Physical layer procedures for data(Dec. 15, 2017.).

The Decision for Rejection of corresponding Japanese application No. 2020-538538, dated Mar. 8, 2022.

The second Office Action of corresponding European application No. 18900192.8 dated Mar. 28, 2022.

\* cited by examiner

DATA TRANSMITTING METHOD, DATA RECEIVING METHOD, TERMINAL DEVICE, AND NETWORK DEVICE

CROSS-REFERENCE TO RELATED APPLICATION

This application is a continuation of International Application No. PCT/CN2018/074357, filed on Jan. 26, 2018, which claims priority to International Patent Application No. PCT/CN2018/072169, which was filed with the Chinese National Intellectual Property Administration on Jan. 10, 2018 and entitled "DATA TRANSMITTING METHOD, DATA RECEIVING METHOD, TERMINAL DEVICE AND NETWORK DEVICE", the disclosure of which is incorporated herein by reference in their entireties.

TECHNICAL FIELD

Embodiments of the present disclosure relate to the field of communications, and more particularly, to a data transmitting method, a data receiving method, a terminal device, and a network device.

BACKGROUND

At present, inter-slot and intra-slot frequency hopping are introduced in fifth-generation mobile communication technology (5-Generation, 5G) New Radio (NR) systems. In addition, intra-slot frequency hopping has been sufficiently discussed, but basically there is no clear conclusion or inter-slot frequency hopping. Therefore, current intra-slot frequency hopping is not able to work.

In addition, Ultra-Reliable and Low Latency Communication (URLLC) is also introduced in 5G. This communication service is characterized by achieving ultra-reliable (e.g., 99.999%) transmissions within extreme delays (e.g., 1 ms). To achieve this goal a concept of grant free is proposed. Grant free uses a pre-configured/semi-persistent resource allocation mode, and a terminal can transmit on configured resources according to service needs. This technology avoids a process of schedule request (SR) and buffer status report (BSR), which increases effective transmission time of the terminal.

However, in a grant free transmission, a location where a user initiates a transmission is flexible, including starting at a determined location and a random location. Due to starting at a random location, an access user is not controllable, so the problem of interference by the access user also needs to be considered in the design of frequency hopping. For example, if a terminal device uses a non-slot transmission, as shown in FIG. 1, the actual transmission of the terminal may only occur on a same frequency domain resource. Frequency diversity gain cannot be guaranteed to be obtained in the non-slot transmission. As a result, transmission resources of multiple terminals overlap, thereby causing user conflicts.

SUMMARY

A data transmitting method, a data receiving method, a terminal device, and a network device are provided, which can effectively improve the frequency diversity gain in the non-slot transmission.

In a first aspect, a data transmitting method is provided, including:

determining, by a terminal device, a target resource based on a time index and/or configuration information, and transmitting, by the terminal device, data to a network device on the target resource.

Since the terminal device in embodiments of the present application directly determines the target resource according to the time index, the terminal device can control resource granularity of the target resource to meet transmission requirements of the terminal device, and can further avoid an actual data transmission process from occurring only on a same frequency domain resource, thereby further improving the frequency diversity gain in the non-slot transmission.

In addition, when the terminal device determines the target resource based on the configuration information, randomness of interference can be enhanced as much as possible to avoid a same user from always or frequently being in conflict, so when a DMRS of the terminal device conflicts with that of other terminals, performance of user identification can be effectively improved, and system transmission efficiency is improved.

In some possible implementations, a unit of a time unit corresponding to the time index includes at least one of the following: at least one symbol, at least one slot, and at least one transmission opportunity.

In some possible implementations, a unit of a time unit corresponding to the time index is determined by the terminal device through high-level signaling or physical layer signaling transmitted by the network device.

In some possible implementations, before the determining, by a terminal device, a target resource based on a time index and/or configuration information, the method further includes:

receiving, by the terminal device, the configuration information transmitted by the network device, where the configuration information is specific information for the terminal device. Here, the determining, by a terminal device, a target resource based on a time index and-or configuration information includes:

determining, by the terminal device, the target resource according to the configuration information.

In some possible implementations, the configuration information includes at least one of the following information:

a first frequency hopping parameter $RB_{start}$, a second frequency hopping parameter $RB_{offset}$, an available resource amount N, a frequency hopping parameter K, and a cut-off point parameter B, where $RB_{start}$ indicates a starting resource location and $RB_{offset}$ is used for the terminal device to obtain a resource location in a next hop.

In some possible implementations, the determining, by the terminal device, the target resource according to the configuration information includes: determining, by the terminal device, the target resource according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

where RB(n) indicates the target resource, mod indicates a modulus operation, $N_{BWP}^{size}$ indicates a size of a bandwidth part, and n indicates the time index.

In some possible implementations, the determining, by the terminal device, the target resource according to the configuration information includes: determining, by the terminal device, the target resource according to the following formula:

$$RB(n)=(RB_{start}+n*RB_{offset})\bmod N_{BWP}^{size};$$

where RB(n) indicates the target resource, mod indicates a modulus operation, $N_{BWP}^{size}$ indicates a size of a bandwidth part, and n indicates the time index.

In some possible implementations, the determining, by the terminal device, the target resource according to the configuration information includes: determining, by the terminal device, the target resource according to the following formula:

$$RB(n)=(RB_{start}+(n\bmod N)*RB_{offset})\bmod N_{BWP}^{size};$$

where RB(n) indicates the target resource, mod indicates a modulus operation, $N_{BWP}^{size}$ indicates a size of a bandwidth part, and n indicates the time index.

In some possible implementations, N is greater than or equal to 2.

In some possible implementations, the determining, by the terminal device, the target resource according to the configuration information includes: determining, by the terminal device, the target resource according to the following formula:

$$RB(n) = \begin{cases} RB_{start} & \text{ceiling}(n/B) \bmod 2 = 0 \\ (RB_{start} + RB_{offset}) \bmod N_{BWP}^{size} & \text{ceiling}(n/B) \bmod 2 = 1 \end{cases};$$

where RB(n) indicates the target resource, mod indicates a modulus operation, ceiling( ) indicates a rounding operation, $N_{BWP}^{size}$ indicates a size of a bandwidth part, and n indicates the time index.

In some possible implementations, the configuration information includes location information of the target resource.

In some possible implementations, the determining, by the terminal device, the target resource according to the configuration information includes:

determining, by the terminal device, the target resource according to the following formula:

$$RB(n)=(RB_{start}+(n\bmod K)*RB_{offset})\bmod N_{BWP}^{size};$$

where RB(n) indicates the target resource, mod indicates a modulus operation, $N_{BWP}^{size}$ indicates a size of a bandwidth part, and n indicates the time index.

In some possible implementations, K is implicitly or explicitly configured by the network device.

In some possible implementations, K is equal to a number of times of repeated transmissions of the data.

In some possible implementations, if a number of times of repeated transmissions of the data is not configured by the terminal device, K is equal to a first value; and if the number of times of repeated transmissions of the data is configured by the terminal device, K is equal to the number of limes of repeated transmissions of the data.

In a second aspect, a data receiving method is provided, including:

determining, by a network device, configuration information for a terminal device to determine a target resource based on a time index, where the configuration information is specific information for the terminal device; determining, by the network device, the target resource based on the configuration information; and, receiving, by the network device on the target resource, data transmitted by the terminal device.

In some possible implementations, before the determining, by the network device, the target resource based on the configuration information, the method further includes: transmitting, by the network device, the configuration information to the terminal device.

In a third aspect, a terminal device is provided, including: a processing unit, configured to determine a target resource based on a time index and/or configuration information; and a transceiving unit, configured to transmit data to a network device on the target resource.

In a fourth aspect, a terminal device is provided, including: a processor, configured to determine a target resource based on a time index and or configuration information; and a transceiver, configured to transmit data to a network device on the target resource.

In a fifth aspect, a network device is provided, including: a processing unit, configured to determine configuration information for a terminal device to determine a target resource based on a time index, where the configuration information is specific information for the terminal device, and determine the target resource based on the configuration information; and a transceiving unit, configured to receive, on the target resource, data transmitted by the terminal device.

In a sixth aspect, a network device is provided, including: a processor, configured to determine configuration information for a terminal device to determine a target resource based on a time index, where the configuration information is specific information for the terminal device, and determine the target resource based on the configuration information; and a transceiver, configured to receive, on the target resource, data transmitted by the terminal device.

In a seventh aspect, a computer-readable medium is provided for storing a computer program, where the computer program includes instructions for executing the method embodiments of the first aspect or the second aspect described above.

In an eighth aspect, a computer chip is provided, including: an input interface, an output interface, at least one processor and a memory, where the processor is configured to execute a code in the memory, and when the code is executed, the processor can implement the various processes performed by the terminal device in the data transmitting method in the first aspect and the various implementations thereof described above.

In a ninth aspect, a computer clip is provided, including: an input interface, an output interface, at least one processor and a memory, where the processor is configured to execute a code in the memory, and when the code is executed, the processor can implement the various processes performed by the network device in the data receiving method in the second aspect and various implementations thereof described above.

According to a tenth aspect, a communication system is provided, including the network device and the terminal device described above.

DESCRIPTION OF EMBODIMENTS

Figure 1:
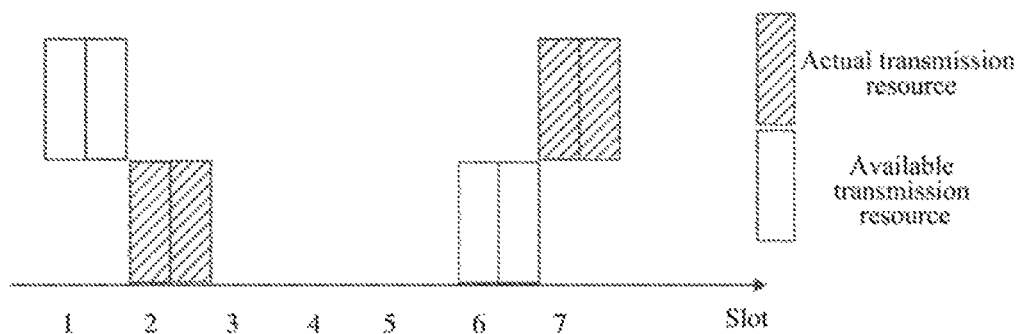
FIG. 1 is a schematic block diagram of a resource location in the prior art.
Figure 2:
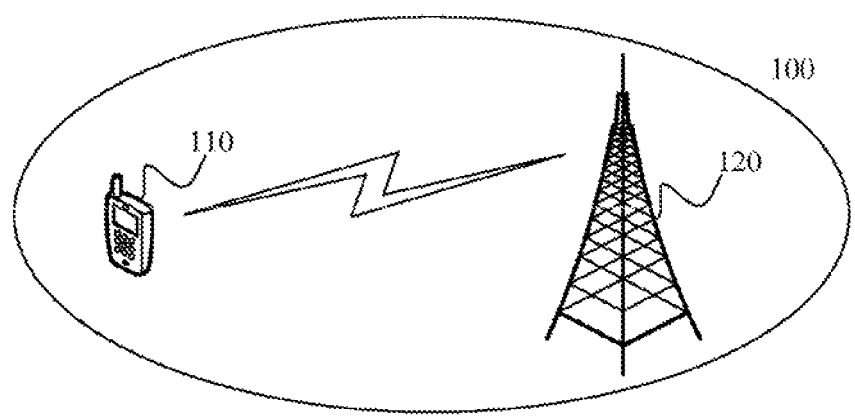
FIG. 2 is an example of an application scenario of the present disclosure according to an embodiment of the present disclosure.

FIG. 2 is a schematic diagram of a 5G application scenario according to an embodiment of the present disclosure.

As shown in FIG. 2, a communication system 100 may include a terminal device 110 and a network device 120. The network device 120 may communicate with the terminal device 110 through an air interface. Multi-service transmission is supported between the terminal device 110 and the network device 120.

It should be understood that the 5G communication system 100 is taken in embodiments of the present disclosure only for exemplary illustration, but the embodiments of the present disclosure arc not limited thereto. That is, the technical solutions of the embodiments of the present disclosure may be applied to various scenarios including a 5G communication system. For example, a scenario with mixed deployment composed of a 5G communication system and a first communication system. The first communication system may be any type of communication system, for example, a Long Term Evolution (LTE) system, a LTE Time Division Duplex (TDD) system, and a Universal Mobile Telecommunication System (UMTS), etc.

In addition, various embodiments are described in conjunction with a network device and a terminal device in the present disclosure.

Here, the network device 120 may refer to any entity that is configured to transmit or receive a signal on a network side, for example, a base station device in a 5G network.

The terminal device 110 may be any terminal device. Specifically, the terminal device 110 may communicate with one or more core networks via a radio access network (RAN), and may also be referred to as an access terminal, a user equipment (UE), a subscriber unit, a subscriber station, a mobile station, a mobile platform, a remote station, a remote terminal, a mobile device, a user terminal, a terminal, a wireless communication device, a user agent, or a user apparatus. For example, it can be a cellular phone, a cordless phone, a Session Initiation Protocol (SIP) phone, a Wireless Local Loop (WLL) station, a Personal Digital Assistant (PDA), and a handheld device with wireless communication functions, a computing device, or other processing devices connected to a wireless modem, an in-vehicle device, a wearable devices, and etc.

Figure 3:
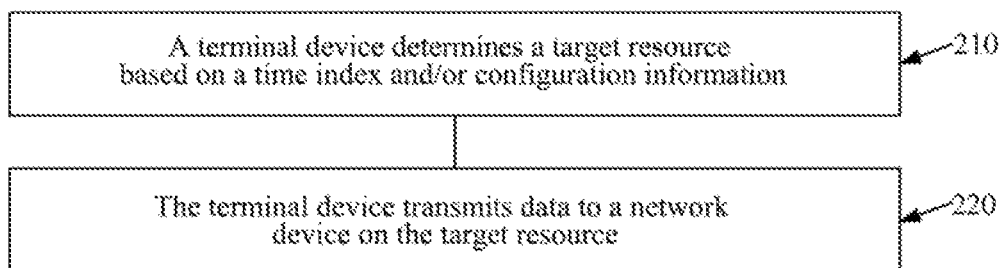
FIG. 3 and FIG. 4 are schematic flowcharts of a data transmitting method according to an embodiment of the present disclosure.

FIG. 3 is a schematic flowchart of a data transmitting method according to an embodiment of the present disclosure.

Specifically, as shown in FIG. 3, the method includes:

210, a terminal device determines a target resource based on a time index and/or configuration information; and 220, the terminal device transmits data to a network device on the target resource.

Specifically, the terminal device may directly determine the target resource based on the time index, or the terminal device may determine the target resource through the configuration information transmitted by the network device.

Then, the terminal device transmits data to the network device on the target resource. Furthermore, the configuration information includes information for the terminal device to determine the target resource based on the time index.

Further, if the terminal device determines the target resource based on the configuration information, the terminal device receives the configuration information transmitted by the network device before it determines the target resource based on the configuration information, where the configuration information is specific information for the terminal device. Therefore, the terminal device determines the target resource according to the configuration information. The network device may also determine the target resource based on the configuration information, and receive, on the target resource, the data transmitted by the terminal device.

In other words, the network device determines the configuration information for the terminal device to determine the target resource based on the time index, where the configuration information is specific information for the terminal device. Before the network device determines the target resource based on the configuration information, the network device transmits the configuration information to the terminal device.

Figure 4:
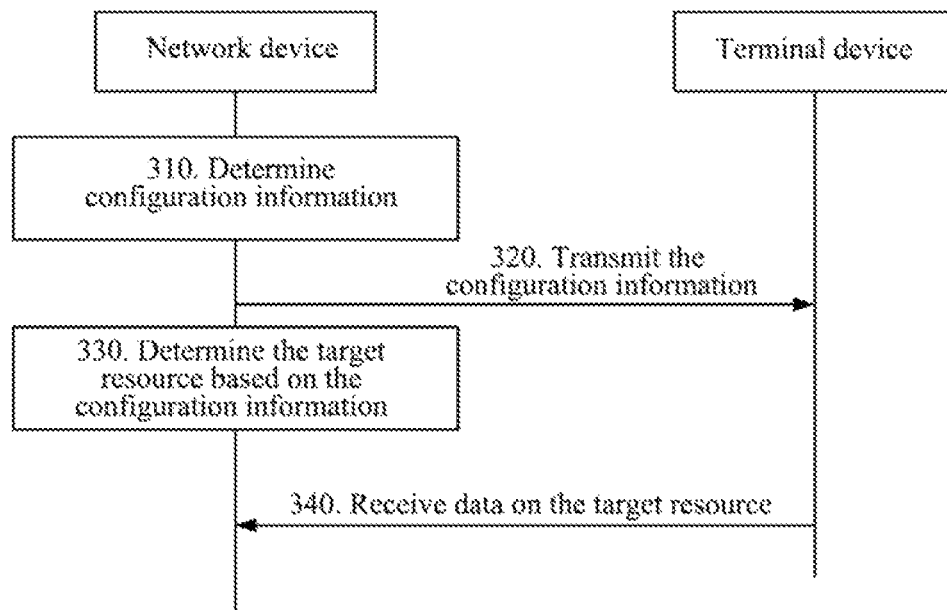

Specifically, as shown in FIG. 4, an interaction process between a network device and a terminal device in embodiments of the present application includes:

310, a network device determines configuration information;

320, the network device transmits the configuration information to a terminal device;

330, the network device determines a target resource based on the configuration information; and 340, the network device receives data on the target resource.

It should be understood that, in the embodiments of the present application, the time index may be understood as an index of a time unit, where the time unit may be understood as a period of time. However, a length of the period of time is not specifically limited in the embodiments of the present application.

For example, in one embodiment, a unit of the time unit corresponding to the time index includes at least one of the following: at least one symbol, at least one slot, and at least one transmission opportunity. Specifically, for example, the unit of the time unit corresponding to the time index may be one symbol, or a time period composed of multiple symbols, or one slot, or a time period composed of multiple slots.

Furthermore, a unit of a time unit corresponding to the time index is determined by the terminal device through high-level signaling or physical layer signaling transmitted by the network device.

For example, the unit of the time unit corresponding to the time index may be directly indicated by the network device or indirectly indicated by the network device, and the unit of the time unit corresponding to the time index may also be specified through a protocol, which is not specifically limited in the present application.

Furthermore, the time unit involved in the embodiments of the present application may refer to a relative time unit or an absolute time unit, which is not specifically limited in the embodiments of the present application.

Since the terminal device in the embodiments of the present application directly determines the target resource according to the time index, the terminal device can control resource granularity of the target resource to meet transmission requirements of the terminal device, and can further avoid an actual data transmission process from occurring only on a same frequency domain resource, thereby further improving the frequency diversity gain in the non-slot transmission.

In addition, when the terminal device determines the target resource based on the configuration information, randomness of interference can be enhanced as much as possible to avoid a same user from always or frequently being in conflict, so when a demodulation reference signal (DMRS) of the terminal device conflicts with that of other terminals, performance of user identification can be effectively improved, and system transmission efficiency is improved.

It should be noted that, in the embodiments of the present application, the terminal device may directly determine the target resource based on the time index, and then control a resource granularity of the target resource. The terminal device may also directly control the resource granularity of the target resource and determine the target resource based on the configuration information, and avoid resource conflicts. However, implementations of determining the target resource are not specifically limited in the embodiments of the present application.

For example, the terminal device may also determine the target resource according to a number of times of data transmission. That is, the terminal device determines a resource location of the target resource based on the number of times of data transmission.

The following is an exemplary illustration of implementations in which the terminal device determines the target resource based on the configuration information in the embodiments of the present application:

In one embodiment, the configuration information includes at least one of the following information:

a first frequency hopping parameter $RB_{start}$, a second frequency hopping parameter $RB_{offset}$, an available resource amount N, a frequency hopping parameter K, and a cut-off point parameter B, where $RB_{start}$ indicates a starting resource location and $RB_{offset}$ is used for the terminal device to obtain a resource location in a next hop. Therefore, the terminal device can obtain the target resource based on respective parameter information in the configuration information.

It should be understood that in the embodiments of the present application, implementations of determining the target resource based on the configuration information are applicable to both a terminal device side and a network device side. Therefore, in order to avoid repetition, below the terminal device side is taken as an example for exemplary description.

The following is an exemplary illustration of a specific implementation of the terminal device determining the target resource based on the example parameters of the configuration information described above.

In one embodiment, the terminal device may determine the target resource according to formula (1):

$$RB(n) = \begin{cases} RB_{start} & n \bmod 2 = 0 \\ (RB_{start} + RB_{offset}) \bmod N_{BWP}^{size} & n \bmod 2 = 1 \end{cases} \quad (1)$$

where RB(n) indicates the target resource, mod indicates a modulus operation, $N_{BWP}^{size}$ indicates a size of a bandwidth part, and n indicates the time index.

Figure 5:
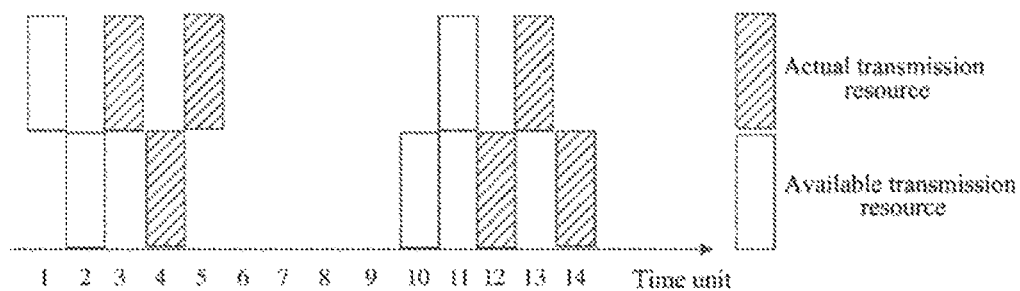
FIG. 5 to FIG. 9 are schematic block diagrams of a resource location of a target resource according to an embodiment of the present disclosure.

Specifically, as shown in FIG. 5, since the resource granularity of the target resource takes a time unit corresponding to the time index as a unit, an actual data transmission process can be avoided from occurring only on a same frequency domain resource, and the frequency diversity gain in the non-slot transmission can be further improved. It should be understood that when the target resource is determined using the above formula (1), the configuration information can include the first frequency hopping parameter $R_{start}$ and/or the second frequency hopping parameter $RB_{offset}$.

In another embodiment, the terminal device may determine the target resource according to formula (2):

$$RB(n) = (RB_{start} + n \ast RB_{offset}) \bmod N_{BWP}^{size} \quad (2)$$

where RB(n) indicates the target resource, mod indicates a modulus operation, $N_{BWP}^{size}$ indicates a size of a bandwidth part, and n indicates the time index.

Figure 6:
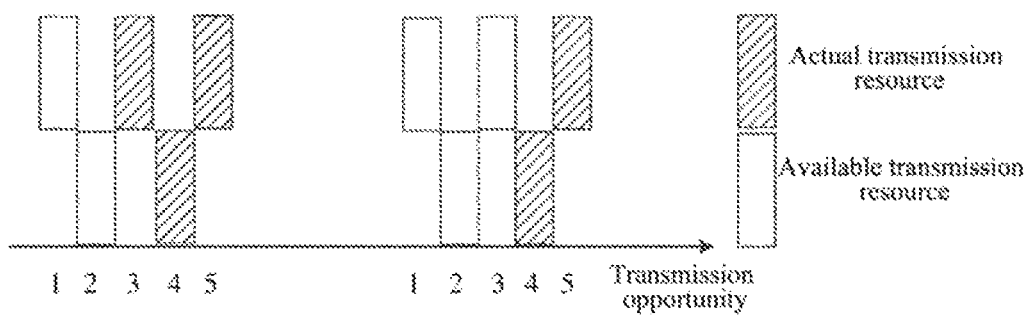

Specifically, as shown in FIG. 6, the unit of the time unit is one transmission opportunity. It should be understood that when the target resource is determined using the above formula (2), the configuration information can include the first frequency hopping parameter $RB_{start}$ and or the second frequency hopping parameter $RB_{offset}$.

In another embodiment, the terminal device may determine the target resource according to formula (3):

$$RB(n) = (RB_{start} + (n \bmod N) \ast RB_{offset}) \bmod N_{BWP}^{size} \quad (3)$$

where RB(n) indicates the target resource, mod indicates a modulus operation, $N_{BWP}^{size}$ indicates a size of a bandwidth part, and n indicates the time index.

It should be understood that when the target resource is determined using the above formula (3), the configuration information can include any one of the first frequency hopping parameter $RB_{start}$, the second frequency hopping parameter $RB_{offset}$, and the available resource amount N.

Figure 7:
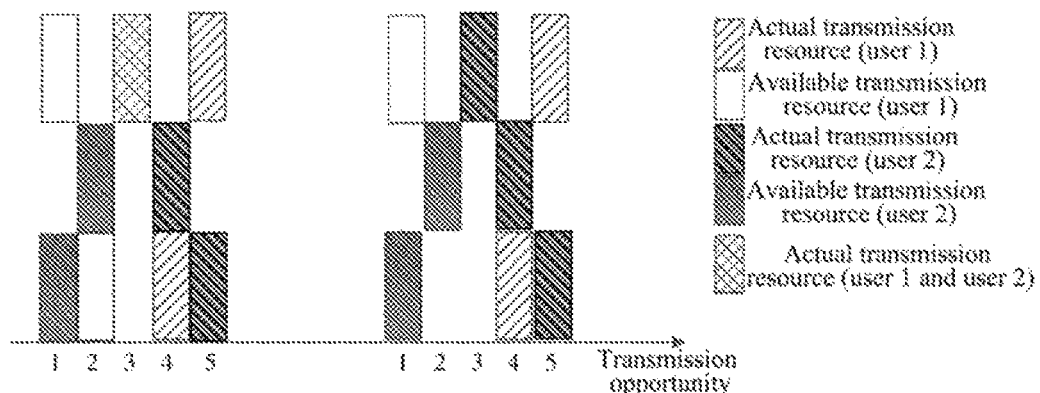

For example, it is assumed that $N_{BWP}^{size}=3$, and in the configuration information of user 1, $RB_{offset}=2$, and the available resource amount N=2, and in the configuration information of user 2, $RB_{offset}=1$ and the available resource amount N=3. As shown in FIG. 7, a probability of resource conflict occurring between the user 1 and the user 2 can be effectively reduced.

Furthermore, in the embodiment of the present application, N can be greater than or equal to 2.

For another example, the terminal device may determine the target resource according to formula (4):

$$RB(n) = \begin{cases} RB_{start} & \text{ceiling}(n/B) \bmod 2 = 0 \\ (RB_{start} + RB_{offset}) \bmod N_{BWP}^{size} & \text{ceiling}(n/B) \bmod 2 = 1 \end{cases} \quad (4)$$

where RB(n) indicates the target resource, mod indicates a modulus operation, ceiling( ) indicates a rounding operation, $N_{BWP}^{size}$ indicates a size of a bandwidth part, and n indicates the time index.

It should be understood that when the target resource is determined using the above formula (4), the configuration information can include any one of the first frequency hopping parameter $RB_{start}$, the second frequency hopping parameter $RB_{offset}$, and the cut-off point parameter B.

Figure 8:
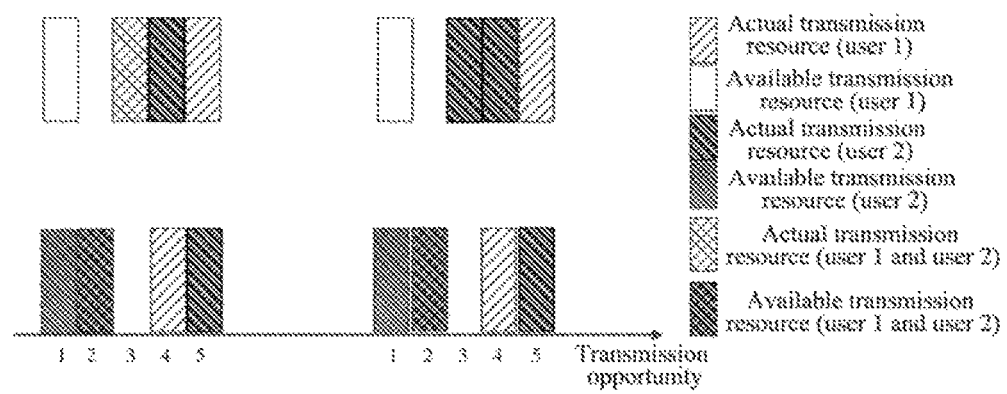

For example, it is assumed that the configuration information in an embodiment of the present application includes the cut-off point parameter B, and in the configuration information of user 1, B=1, and in the configuration information of user 2, B=2. As shown in FIG. 8, a probability of resource conflict occurring between the user 1 and the user 2 can be effectively reduced For another example, the terminal device may determine the target resource according to formula (5):

$$RB(n)=(RB_{start}+(n \bmod K)*RB_{offset}) \bmod N_{BWP}^{size} \quad (5)$$

where RB(n) indicates the target resource, mod indicates a modulus operation, $N_{BWP}^{size}$ indicates a size of a bandwidth part, and n indicates the time index.

It should be understood that when the target resource is determined using the above formula (5), the configuration information can include any one of the first frequency hopping parameter $RB_{start}$, the second frequency hopping parameter $RB_{offset}$, and the frequency hopping parameter K.

K can be implicitly or explicitly configured by the network device.

For example, K is equal to a number of times of repeated transmissions of the data.

Furthermore, if a number of times of repeated transmissions of the data is not configured by the terminal device, K can default to be equal to a first value; and if the number of times of repeated transmissions of the data is configured by the terminal device, K is equal to the number of times of repeated transmissions of the data.

For example, if the number of times of repeated transmissions of the data is not configured by the terminal device, K can default to be equal to 2; and if the number of times of repeated transmissions of the data is configured by the terminal device, K is equal to the number of times of repeated transmissions of the data.

It should also be understood that the above formula (1), formula (2), formula (3), formula (4), and formula (5) are only for an exemplary description of the terminal device determining the target resource based on frequency modulation parameters in the configuration information in the embodiments of the present application, and the manner in which the terminal device determines the target resource based on the configuration information in the embodiments of the present application is not limited to the above formulas.

In another embodiment, the configuration information includes location information of the target resource. Therefore, the terminal device can directly transmit the data to the network device based on the location information of the target resource.

Figure 9:
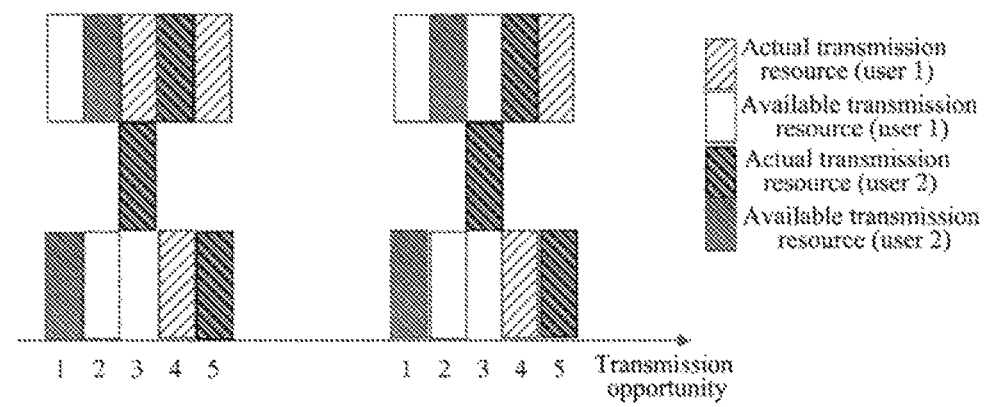

For example, it is assumed that the configuration information in an embodiment of the present application includes a series of transmission resources. As shown in FIG. 9, it is assumed that user 1 is configured with {RB_1, RB_3, RB_1, RB_3, RB_1}, and user 2 is configured with {RB_3, RB_1, RB_2, RB_1, RB_3}. Then, the manner in the embodiment of the present application can effectively reduce a probability of resource conflict occurring between the user 1 and the user 2, or even zero conflict can be reached.

Figure 10:
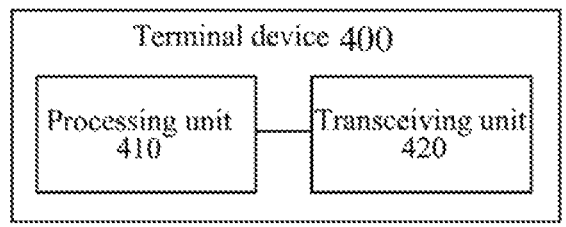
FIG. 10 and FIG. 11 are schematic block diagrams of a terminal device according to an embodiment of the present disclosure.

FIG. 10 is a schematic block diagram of a terminal device according to an embodiment of the present application.

Specifically, as shown in FIG. 10, a terminal device 400 includes:

a processing unit 410, configured to determine a target resource based on a time index and/or configuration information, and a transceiving unit 420, configured to transmit data to a network device on the target resource.

In an embodiment, a unit of a time unit corresponding to the time index includes at least one of the following, at least one symbol, at least one slot, and at least one transmission opportunity.

In an embodiment, a unit of a time unit corresponding to the time index is determined by the terminal device through high-level signaling or physical layer signaling transmitted by the network device.

In an embodiment, the transceiving unit 420 is further configured to: receive the configuration information transmitted by the network device before the processing unit 410 determines the target resource based on the time index and/or the configuration information, where the configuration information is specific information for the terminal device. The processing unit 410 is specifically configured to determine the target resource according to the configuration information.

In an embodiment, the configuration information includes at least one of the following information: a first frequency hopping parameter $R_{start}$, a second frequency hopping parameter $RB_{offset}$, an available resource amount N, a frequency hopping parameter K, and a cut-off point parameter B, where $RB_{start}$ indicates a starting resource location and $RB_{offset}$ is used for the terminal device to obtain a resource location in a next hop.

In an embodiment, the processing unit 410 is specifically configured to determine the target resource according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

where RB(n) indicates the target resource, mod indicates a modulus operation, $N_{BWP}^{size}$ indicates a size of a bandwidth part, and n indicates the time index.

In an embodiment, the processing unit 410 is specifically configured to determine the target resource according to the following formula:

$$RB(n)=(RB_{start}+n*RB_{offset}) \bmod N_{BWP}^{size};$$

where RB(n) indicates the target resource, mod indicates a modulus operation, $N_{BWP}^{size}$ indicates a size of a bandwidth part, and n indicates the time index.

In an embodiment, the processing unit 410 is specifically configured to determine the target resource according to the following formula:

$$RB(n)=(RB_{start}+(n \bmod N)*RB_{offset}) \bmod N_{BWP}^{size};$$

where RB(n) indicates the target resource, mod indicates a modulus operation, $N_{BWP}^{size}$ indicates a size of a bandwidth part, and n indicates the time index.

In an embodiment, N is greater than or equal to 2.

In an embodiment, the processing unit 410 is specifically configured to determine the target resource according to the following formula:

$$RB(n) = \begin{cases} RB_{start} & \text{ceiling}(n/B) \bmod 2 = 0 \\ (RB_{start} + RB_{offset}) \bmod N_{BWP}^{size} & \text{ceiling}(n/B) \bmod 2 = 1 \end{cases};$$

where RB(n) indicates the target resource, mod indicates a modulus operation, ceiling( ) indicates a rounding operation, $N_{BWP}^{size}$ indicates a size of a bandwidth part, and n indicates the time index.

In an embodiment, the processing unit 410 is specifically configured to determine the target resource according to the following formula:

$$RB(n)=(RB_{start}+(n \bmod K)*RB_{offset}) \bmod N_{BWP}^{size};$$

where RB(n) indicates the target resource, mod indicates a modulus operation, $N_{BWP}^{size}$ indicates a size of a bandwidth part, and n indicates the time index.

In an embodiment, K is implicitly or explicitly configured by the network device.

In an embodiment, K is equal to a number of times of repeated transmissions of the data.

In an embodiment, if a number of times of repeated transmissions of the data is not configured by the terminal device, K is equal to a first value; and if the number of times of repeated transmissions of the data is configured by the terminal device, K is equal to the number of times of repeated transmissions of the data.

In an embodiment, the configuration information includes location information of the target resource.

Figure 11:
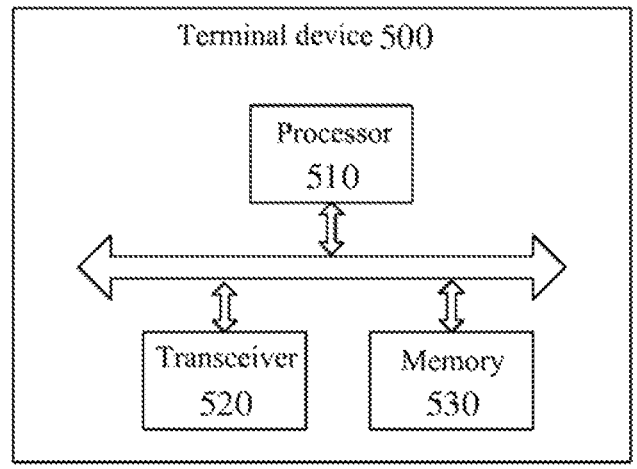

In an embodiment of the present disclosure, the processing unit 410 may be implemented by a processor, and the transceiving unit 420 may be implemented by a transceiver. As shown in FIG. 11, a terminal device 500 may include a processor 510, a transceiver 520, and a memory 530. The memory 530 may be configured to store instruction information, and may also be configured to store a code, an instruction, and the like executed by the processor 510. Various components in the terminal device 500 are connected through a bus system. The bus system includes a power bus, a control bus, and a status signal bus in addition to a data bus.

The terminal device 500 shown in FIG. 11 can implement various processes implemented by the terminal device in the foregoing method embodiments shown in FIG. 3 and FIG. 4. To avoid repetition, details are not described herein again.

Figure 12:
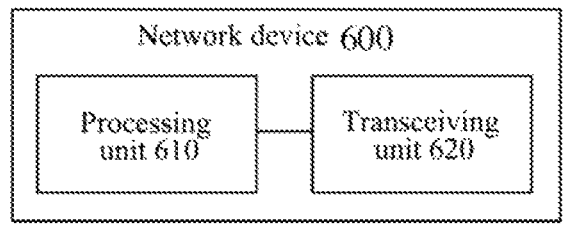
FIG. 12 and FIG. 13 are schematic block diagrams of a network device according to an embodiment of the present disclosure.

FIG. 12 is a schematic block diagram of a network device according to an embodiment of the present application.

Specifically, as shown in FIG. 12, a network device 600 includes:

a processing unit 610, configured to determine configuration information for a terminal device to determine a target resource based on a time index, where the configuration information is specific information for the terminal device, and determine the target resource based on the configuration information; and a transceiving unit 620, configured to receive, on the target resource, data transmitted by the terminal device.

In an embodiment, the transceiving unit 620 is further configured to transmit the configuration information to the terminal device before the processing unit 610 determines the target resource based on the configuration information, In an embodiment, a unit of a time unit corresponding to the time index includes at least one of the following: at least one symbol, at least one slot, and at least one transmission opportunity.

In an embodiment, a unit of a time unit corresponding to the time index is determined by the terminal device through high-level signaling or physical layer signaling transmitted by the network device.

In an embodiment, the configuration information includes at least one of the following information:

a first frequency hopping parameter $RB_{start}$, a second frequency hopping parameter $RB_{offset}$, an available resource amount N, a frequency hopping parameter K, and a cut-off point parameter B, where $RB_{start}$ indicates a starting resource location and $RB_{offset}$ is used for the terminal device to obtain a resource location in a next hop.

In an embodiment, the processing unit 610 is specifically configured to determine the target resource according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

where RB(n) indicates the target resource, mod indicates a modulus operation, $N_{BWP}^{size}$ indicates a size of a bandwidth part, and n indicates the time index.

In an embodiment, the processing unit 610 is specifically configured to determine the target resource according to the following formula:

$$RB(n) = (RB_{start} + n*RB_{offset}) \bmod N_{BWP}^{size};$$

where RB(n) indicates the target resource, mod indicates a modulus operation, $N_{BWP}^{size}$ indicates a size of a bandwidth part, and n indicates the time index.

In an embodiment, the processing unit 610 is specifically configured to determine the target resource according to the following formula:

$$RB(n) = (RB_{start} + (n \bmod N)*RB_{offset}) \bmod N_{BWP}^{size};$$

where RB(n) indicates the target resource, mod indicates a modulus operation, $N_{BWP}^{size}$ indicates a size of a bandwidth part, and n indicates the time index.

In an embodiment, N is greater than or equal to 2.

In an embodiment, the processing unit 610 is specifically configured to determine the target resource according to the following formula:

$$RB(n) = \begin{cases} RB_{start} & \text{ceiling}(n/B) \bmod 2 = 0 \\ (RB_{start} + RB_{offset}) \bmod N_{BWP}^{size} & \text{ceiling}(n/B) \bmod 2 = 1 \end{cases};$$

where RB(n) indicates the target resource, mod indicates a modulus operation, ceiling( ) indicates a rounding operation, $N_{BWP}^{size}$ indicates a size of a bandwidth part, and n indicates the time index.

In an embodiment, the processing unit 610 is specifically configured to determine the target resource according to the following formula:

$$RB(n) = (RB_{start} + (n \bmod K)*RB_{offset}) \bmod N_{BWP}^{size};$$

where RB(n) indicates the target resource, mod indicates a modulus operation, $N_{BWP}^{size}$ indicates a size of a bandwidth part, and n indicates the time index.

In an embodiment, K is implicitly or explicitly configured by the network device.

In an embodiment, K is equal to a number of times of repeated transmissions of the data.

In an embodiment, if a number of times of repeated transmissions of the data is not configured by the terminal device, K is equal to a first value; and if the number of times of repeated transmissions of the data is configured by the terminal device, K is equal to the number of times of repeated transmissions of the data.

In an embodiment, the configuration information includes location information of the target resource.

Figure 13:
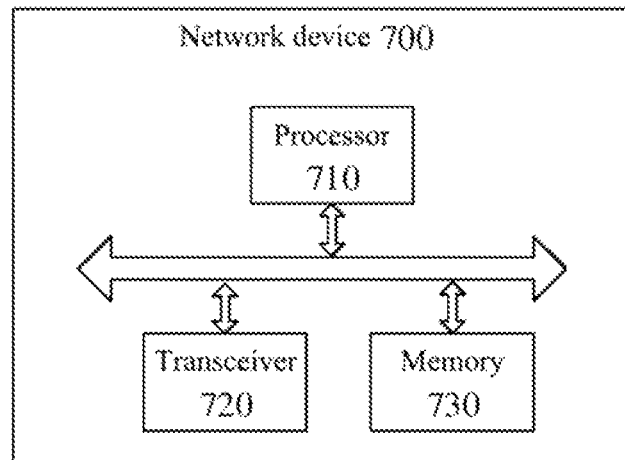

In an embodiment of the present disclosure, the processing unit 610 may be implemented by a processor, and the transceiving unit 620 may be implemented by a transceiver. As shown in FIG. 13, a network device 700 may include a processor 710, a transceiver 720, and a memory 730. The network device 700 can implement various processes implemented by the network device in the foregoing method embodiments shown in FIG. 3 and FIG. 4. To avoid repetition, details are not described herein again. That is, the method embodiments in the embodiments of the present disclosure may be implemented by a processor and a transceiver.

In the implementation process, each step of the method embodiments in the embodiments of the present disclosure may be completed by an integrated logic circuit of hardware in the processor or an instruction in a software form. More specifically, with reference to the methods disclosed in the embodiments of the present disclosure, steps may be represented directly as being implemented by a hardware decoding processor, or implemented by a combination of hardware and software modules in a decoding processor. The software module may be located in a storage medium mature in the art, such as a random access memory, a flash memory, a read-only memory, a programmable read-only memory, an electrically erasable programmable memory, or a register. The storage medium is located in the memory, and the processor reads information in the memory and completes the steps of the foregoing methods in combination with hardware thereof.

It should be understood that the processor mentioned in the embodiments of the present disclosure may be an integrated circuit chip with signal processing capabilities, and may implement or execute the methods, steps, and logic block diagrams disclosed in the embodiments of the present disclosure. For example, the aforementioned processor may be a general-purpose processor, a digital signal processor (DSP), an application specific integrated circuit (ASIC), a field programmable gate array (FPGA), or another programmable logic device, a transistor logic device, a discrete hardware component, and more. In addition, the general-purpose processor may be a microprocessor or the processor may be any conventional processor or the like.

In addition, the memory mentioned in the embodiments of the present disclosure may be a volatile memory or a non-volatile memory, or may include both the volatile memory and the non-volatile memory. The non-volatile memory may be a read-only memory (ROM), a programmable read-only memory (PROM), an erasable programmable read-only memory (erasable PROM, EPROM), or an electrically erasable programmable read-only memory (electrically EPROM, EEPROM) or a flash memory. The volatile memory may be a random access memory (RAM), which is used as an external cache, it should be understood that the foregoing memory is for exemplary but not restrictive description. For example, the memory in the embodiments of the present disclosure may also be a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synch link dynamic random access memory (synch link DRAM, SLDRAM) and a direct Rambus random access memory (Direct Rambus RAM, DR RAM), etc. That is, the memory of the systems and methods described herein is intended to include, but not limited to, these memories and any memory of another suitable type.

Finally, it should be noted that the terminology used in the embodiments of the present disclosure and the appended claims is for the purpose of describing particular embodiments only and is not intended to limit the embodiments of the disclosure.

For example, the singular forms "a", "the", and "the foregoing" used in the embodiments of the present disclosure and the appended claims are also intended to include the plural forms unless the context clearly indicates otherwise meaning.

Those of ordinary skill in the art may realize that the units and algorithm steps of each example described in connection with the embodiments disclosed herein can be implemented by electronic hardware, or a combination of computer software and electronic hardware. Whether these functions are performed in hardware or software depends on the specific application and design constraints of the technical solution. Professional technicians can use different methods to implement the described functions for each specific application, but such implementation should not be considered to be beyond the scope of the embodiments of the present disclosure.

Those skilled in the art can clearly understand that, for the convenience and brevity of description, the specific working processes of the systems, apparatuses, and units described above can refer to the corresponding processes in the foregoing method embodiments, and are not repeated here.

In the several embodiments provided in the present application, it should be understood that the disclosed systems, apparatuses, and methods may be implemented in other ways. For example, the apparatus embodiments described above are only schematic. For example, the division of the unit is only a logical function division. In actual implementation, there may be another division manner. For example, multiple units or components may be combined or integrated into another system, or some features can be ignored or not implemented. In addition, the displayed or discussed mutual coupling or direct coupling or communication connection may be indirect coupling or communication connection though some interfaces, apparatuses or units, which may be electrical, mechanical or other forms.

The units described as separate components may or may not be physically separated, and the components displayed as units may or may not be physical units, may be located in one place, or may be distributed on multiple network units. Some or all of the units may be selected according to actual needs to achieve the objectives of the embodiments of the present disclosure.

In addition, the functional units in the embodiments of the present disclosure may be integrated into one processing unit, or each of the units may exist separately physically, or two or more units may be integrated into one unit.

If it is implemented in the form of a software functional unit and sold or used as an independent product, it can be stored in a computer-readable storage medium. Based on this understanding, the technical solutions of the embodiments of the present disclosure in nature, or a part thereof that contributes to the existing technology, or a part of the technical solutions may be embodied in the form of a software product, which is stored in a storage medium inducing a plurality of instructions for causing a computer device (which may be a personal computer, a server, or a network device, etc.) to perform all or part of the steps of the method described in the embodiments of the present disclosure. The foregoing storage medium includes various media that can store program codes, such as a U disk, a mobile hard disk, a read-only memory, a random access memory, a magnetic disk, or an optical disk.

The above contents are only specific implementations of the embodiments of the present disclosure, but the protection scope of the embodiments of the present disclosure is not limited thereto. Any person skilled in the art can easily think of changes or replacements within the technical scope disclosed in the embodiments of the present disclosure, which should be covered within the protection scope of the embodiments of the present disclosure. Therefore, the protection scope of the embodiments of the present disclosure shall be subject to the protection scope of the claims.

What is claimed is:

1. A data transmitting method, comprising:
   determining, by a terminal device, a target resource based on configuration information and an index of a transmission opportunity; and
   transmitting, by the terminal device, data to a network device on the target resource;
   wherein the determining, by a terminal device, a target resource based on configuration information and an index of a transmission opportunity comprises:
   determining, by the terminal device, the target resource according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

wherein RB(n) indicates the target resource, mod indicates a modulus operation, $N_{BWP}^{size}$ indicates a size of a bandwidth part, n indicates the index of the transmission opportunity, $RB_{start}$ indicates a starting resource location, and $RB_{offset}$ is used for the terminal device to obtain a resource location in a next hop.

2. The method according to claim 1, wherein the transmission opportunity is configured by high-level signaling or physical layer signaling.

3. The method according to claim 1, wherein the configuration information is specific information for the terminal device.

4. A data receiving method, comprising:
   transmitting, by a network device, configuration information to a terminal device; and
   receiving, by the terminal device on a target resource, data transmitted by the terminal device; wherein the target resource is determined based on the configuration information and an index of a transmission opportunity;
   wherein the target resource is determined according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

wherein RB(n) indicates the target resource, mod indicates a modulus operation, $N_{BWP}^{size}$ indicates a size of a bandwidth part, n indicates the index of the time unit, $RB_{start}$ indicates a starting resource location, and $RB_{offset}$ is used for the terminal device to obtain a resource location in a next hop.

5. The method according to claim 4, wherein the transmission opportunity is configured by high-level signaling or physical layer signaling.

6. The method according to claim 4, wherein the configuration information is specific information for the terminal device.

7. A terminal device, comprising:
   a processor, configured to determine a target resource based on configuration information and an index of a transmission opportunity; and
   a transceiver, configured to transmit data to a network device on the target resource;
   wherein the processor is configured to determine the target resource according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

wherein RB(n) indicates the target resource, mod indicates a modulus operation, $N_{BWP}^{size}$ indicates a size of a bandwidth part, n indicates the index of the transmission opportunity, $RB_{start}$ indicates a starting resource location, and $RB_{offset}$ is used for the terminal device to obtain a resource location in a next hop.

8. The terminal device according to claim 7, wherein the transmission opportunity is configured by high-level signaling or physical layer signaling.

9. The terminal device according to claim 7, wherein the configuration information is specific information for the terminal device.

10. A network device, comprising:
    a transceiver, configured to transmit configuration information to a terminal device; and receive, on a target resource, data transmitted by the terminal device;
    wherein the target resource is determined based on the configuration information and an index of a transmission opportunity; and
    the target resource is determined according to the following formula:

$$RB(n) = \begin{cases} RB_{start} & n \bmod 2 = 0 \\ (RB_{start} + RB_{offset}) \bmod N_{BWP}^{size} & n \bmod 2 = 1 \end{cases};$$

wherein RB(n) indicates the target resource, mod indicates a modulus operation, $N_{BWP}^{size}$ indicates a size of a bandwidth part, n indicates the index of the time unit, $RB_{start}$ indicates a starting resource location, and $RB_{offset}$ is used for the terminal device to obtain a resource location in a next hop.

11. The network device according to claim 10, wherein the transmission opportunity is configured by high-level signaling or physical layer signaling.

12. The network device according to claim 10, wherein the configuration information is specific information for the terminal device.

* * * * *